UNITED STATES PATENT OFFICE.

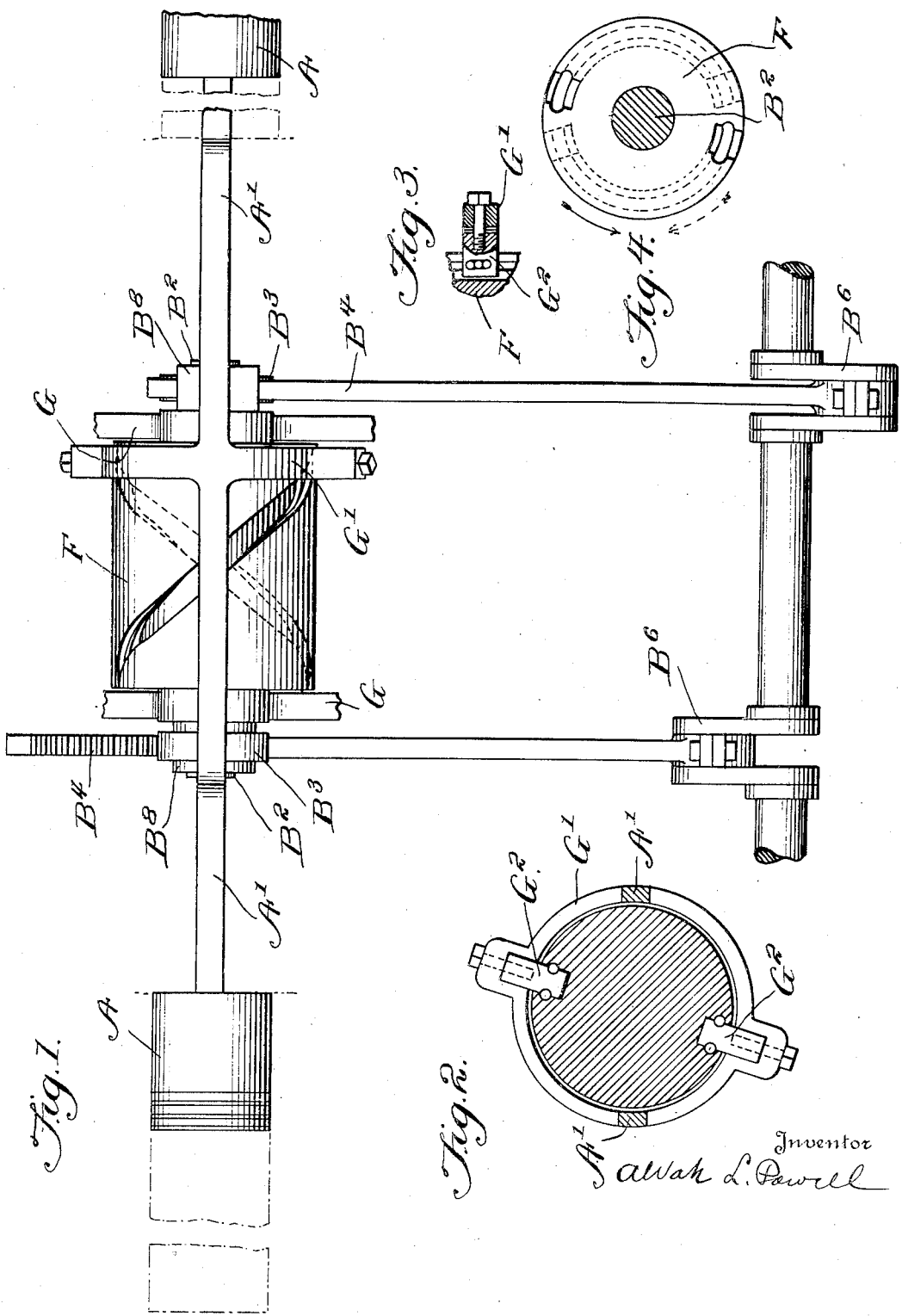

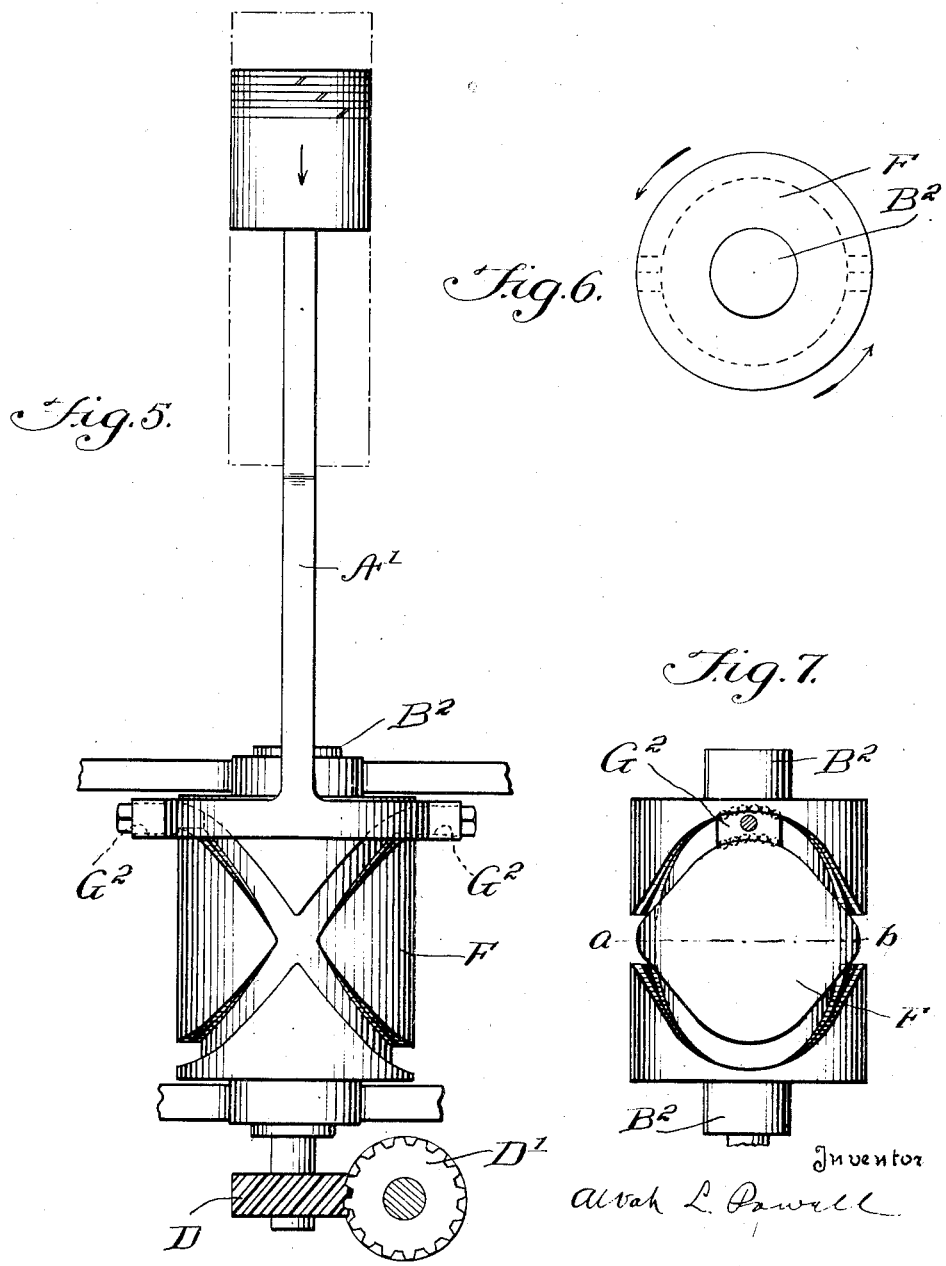

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,344. Specification of Letters Patent. Patented July 12, 1921.

Application filed December 8, 1920. Serial No. 429,178.

*To all whom it may concern:*

Be it known that I, ALVAH L. POWELL, citizen of the United States, residing at Miles City, in the county of Custer and State of Montana, have invented certain new and useful Improvements in Transmissions for Engines, of which the following is a specification.

My invention relates to improvements in the transmitting member of engines, by which I secure a variation in the movement of the piston with reference to that of the crank, enabling me to gain advantages in the operation of such engines that are not possible with the constructions at present used. This application covers improvements over the forms shown in a series of applications bearing Serial Numbers 429,168, 429,170 to 429,176, inclusive, filed simultaneously with the present one but, while the general principles are the same, the construction herein described includes elements of a novel form.

In this application I show a modification of my transmission members, in which I use a cylinder, actuated by the pressure of a reciprocating ring that carries ball retaining blocks, the balls engaging the sides of spiral grooves, cut in the circumferential surface of said cylinder. The balls compose a means of minimizing friction due to the thrust imparted to the cylinder spirals during the reciprocating action of the rings. The motion of the rings is derived from horizontally disposed pistons, the linear movement of the latter being converted into circular, under the conditions given. In the accompanying drawings I show an adaptation of my invention, in which—

Figure 1 is a front elevation, showing the transmission members attached to an engine, the latter being indicated by pistons and crank shaft.

Fig. 2 is a cross section of the cylinder and thrust ring.

Fig. 3 is a detail of the ball retaining means.

Fig. 4 is an end elevation of cylinder.

Fig. 5 is a modification of the construction shown in the previous views, by which I am able to effect complete rotation of cylinder.

Fig. 6 is an end elevation of the cylinder, the path of the spiral being indicated in dotted lines.

Fig. 7 is a plan view of the cylinder, showing a thrust block in position in the spiral groove, the anti-friction balls in place.

In Fig. 1, a cylinder, F, is rotatable on a shaft, the ends which appear at $B^2$, $B^2$, supported by bearings, G, G, from any convenient point in the engine frame. The cylinder has cut on its surface two spirals, each making about half a turn with reference to the circumference. These spirals are on opposite sides of cylinder, and are independent of each other, Fig. 1. From the pistons of any engine, but here understood, preferably, of one of the two cycle, internal combustion type, the piston rod, $A^1$, extends between and connects them. The said rod is formed to overlap and pass along the length of the cylinder F. Supported by this rod is a ring, $G^1$, which incloses the circumference of part of the cylinder and engages the surface of the latter for a crosshead slide bearing. On the ring $G^1$ are located, at opposite points, blocks, $G^2$, $G^2$, held on the ring by tap bolts and cap, as shown in Fig. 3. In the blocks are a number of balls, preferably of steel, which project from a retaining pocket or groove, and touch the sides of the spiral grooves in the cylinder F. On the shaft, $B^2$, of the cylinder F are mounted pinions, $B^3$, $B^3$, preferably keyed thereto. These pinions mesh with vertically disposed racks, $B^4$, $B^4$, that form part of the crank rods extending from the engine shaft cranks, $B^6$, $B^6$. In order to hold the racks in contact with the pistons I employ swinging brackets, hung on the ends of shaft $B^2$, the rear inner surface of said brackets serving as a sliding and retaining means for the racks. The free movement of the racks with reference to the shaft further enables them to follow the angular movement of the crank rods. The brackets are shown at $B^8$, $B^8$. A description of these brackets forms part of a previous application.

Assuming that piston A moves toward the center line of drawing; that is, forward, the rod $A^1$ will cause the ringed section that carries the ball blocks to travel in the same direction. The pressure of the balls against the lower side of the spiral groove will impart movement to the cylinder, at right angles to its axis. At the end of stroke, the piston A will force the rod $A^1$ in the opposite direction and the movement of the cylinder will reverse. These movements will be communicated to the pinions B³, B³, through the shaft B² which, in turn, will transmit it to the racks, giving them a reciprocating motion. As the shaft cranks are set at one hundred and eighty degrees this will cause the shaft to revolve.

Let it be assumed that the length of cylinders will allow a movement of six inches of the ball blocks, and that this is the stroke of the engine pistons. Let the pinions B³, B³ have a pitch diameter that will effect a movement of four inches in the vertical racks. Then, the throw of the engine cranks will be four inches. In other words, the six inch piston stroke will be condensed into a four inch crank stroke. This differential relation may be changed by altering the relative diameters of the pinions. The excess of stroke of pistons over that of cranks may be used for various purposes, raising the efficiency of engines in which this gear forms a part. These specific effects have been defined in previous applications.

In Figs. 5, 6 and 7, I show an arrangement of parts by which I secure a complete rotation of the cylinder, F, this rotation being continuous in one direction.

In Fig. 5 the parts are substantially as already described, except that instead of the racks and pinions, the spiral gear D transmits the movement of the shaft B² to a power shaft having a meshing gear, D¹. On the cylinder F are cut two spirals that intersect at points $a$—$b$, and are continuous about cylinder circumference. The thrust blocks, G², G², on the outstroke of piston, press against the walls of the grooves, the cylinder turning as a consequence. As the ring carrying the thrust blocks advances, they reach the points of intersection, $a$—$b$. At these points the balls lap, to maintain the pressure, and the cylinder continues its movement of rotation in the same direction, for the balance of stroke. On the return stroke, the revolution of the cylinder maintains a constant relation between the grooves and thrust blocks, the grooves being continuous, as before stated. At the points of engine reversal, the momentum of engine shaft carries the cylinder movement past the dead points, the rotation in one direction being continuously maintained, as a result.

Any desired differential relation between piston stroke and crank shaft stroke may be effected by changing the pitch diameters of the spiral gears with reference to each other, or with reference to the pitch of the cylinder spiral.

What I claim is new, and ask to have protected by Letters Patent, is—

In a differential transmission member, the combination of a cylinder, spiral grooves in the circumferential surface of said cylinder, a supporting shaft revoluble with said cylinder, slidable blocks operable in said grooves, a connecting rod to a source of power and supporting the said blocks, segmental pinions on the cylinder shaft, racks engaging said pinions, movable guides for said racks, and means for connecting said racks to the cranks of a power shaft, substantially as described.

In testimony whereof I affix my signature.

ALVAH L. POWELL.